United States Patent
Payne et al.

(10) Patent No.: US 6,394,370 B1
(45) Date of Patent: May 28, 2002

(54) RECIPROCATING WAND VEHICLE WASH APPARATUS

(75) Inventors: Don L. Payne, Lehi, UT (US); James D. Johnson, Westminster, CO (US)

(73) Assignee: Mark VII Equipment, Inc., Arvada, CO (US)

( * ) Notice: Subject to any disclaimer, the term of this patent is extended or adjusted under 35 U.S.C. 154(b) by 0 days.

(21) Appl. No.: 09/698,845

(22) Filed: Oct. 27, 2000

Related U.S. Application Data
(60) Provisional application No. 60/234,409, filed on Sep. 21, 2000.

(51) Int. Cl.⁷ .............................. B05B 3/00; B05B 3/18
(52) U.S. Cl. ..................... 239/722; 239/726; 239/734; 239/739; 239/743; 239/751; 239/752; 134/123
(58) Field of Search .................. 239/722, 726, 239/734, 739, 743, 750, 751, 752; 134/123

(56) References Cited

U.S. PATENT DOCUMENTS

| | | | |
|---|---|---|---|
| 2,936,770 A | 5/1960 | Emanuel | 134/123 |
| 3,259,138 A | 7/1966 | Heinicke | 134/45 |
| 3,289,449 A | 12/1966 | O'Brien | 72/201 |
| 3,445,286 A | 5/1969 | Smith, Jr. et al. | 134/32 |
| 3,460,548 A | 8/1969 | Giovagnoli | 134/58 |
| 3,496,908 A | 2/1970 | Bernardi | 118/2 |
| 3,510,352 A * | 5/1970 | Neuman | 134/123 X |
| 3,529,611 A | 9/1970 | Daum et al. | 134/112 |
| 3,545,460 A | 12/1970 | Daum | 134/123 |
| 3,570,502 A | 3/1971 | Farnsworth et al. | 134/45 |
| 3,575,184 A | 4/1971 | Jurkens | 134/45 |
| 3,593,730 A | 7/1971 | Burchett | 134/123 |
| 3,688,784 A | 9/1972 | Daum et al. | 134/123 |
| 3,786,823 A | 1/1974 | Wiley | 134/45 |
| 4,231,239 A | 11/1980 | Lazaroff | 6/205 R |
| 4,788,993 A | 12/1988 | Beer et al. | 134/123 |
| 4,857,113 A | 8/1989 | Hodge | 134/32 |
| 4,895,307 A | 1/1990 | Swinehart et al. | 239/263 |
| 4,971,084 A | 11/1990 | Smith et al. | 134/45 |
| 5,076,304 A | 12/1991 | Mathews | 134/57 |
| 5,161,557 A | 11/1992 | Scheiter, Jr. | 134/57 R |
| 5,280,855 A * | 1/1994 | Rietsch, Jr. | 1339/123 X |
| 5,326,037 A * | 7/1994 | Hour | 239/752 X |
| 5,447,574 A | 9/1995 | Inoue | 134/18 |
| 5,482,212 A * | 1/1996 | Kobryn et al. | 239/752 X |
| 5,806,542 A | 9/1998 | Hoffer et al. | 134/57 R |

FOREIGN PATENT DOCUMENTS

GB          686716          1/1953

* cited by examiner

Primary Examiner—Robin O. Evans
(74) Attorney, Agent, or Firm—Dorsey & Whitney LLP

(57) ABSTRACT

A wash apparatus for automotive vehicles includes a plurality of reciprocating wands which are driven by a compact drive/linkage system to move the wands in unitary reciprocating motion as a vehicle is moved adjacent thereto. Each wand has a turbo nozzle that emits a stream of liquid in a circulating conical path which in cooperation with the reciprocating movement of the wands on which the nozzles are rotated creates a desired cleaning action.

7 Claims, 5 Drawing Sheets

RECIPROCATING WAND VEHICLE WASH APPARATUS

CROSS-REFERENCE TO RELATED APPLICATION

This application claims priority to provisional application Ser. No. 60/234,409, filed Sep. 21, 2000.

BACKGROUND OF THE INVENTION

1. Field of the Invention

The present invention relates generally to wash apparatus for automotive vehicles and, more particularly, to an apparatus that includes at least one reciprocating wand with the wand including a pair of turbo nozzles adapted to emit a straight beam of water in a circulating conical spray pattern onto the surface of an adjacent vehicle.

2. Description of the Relevant Art

There are many techniques for washing vehicles without conventional hand scrubbing. Perhaps the most common washing system is the tunnel-type car wash system wherein a vehicle to be washed is passed through a series of linearly spaced cleaning stations. Each cleaning station executes a different sequential cleaning operation such as pre-soaking, rinsing, scrubbing, waxing and related operations. However, although tunnel-type washes are generally considered to be effective in washing vehicles, tunnel-type washes may be detrimental to a vehicle's finish.

For example, some conventional tunnel-type wash systems, "mitter curtains" comprised of strips of cloths that are rocked back and forth transversely across the path of the vehicle abrasively scrub dirt and other debris from the surface of the vehicle. Alternately, or in combination with mitter curtains, revolving brushes may rotatably engage the surface of the vehicle. In either case, the vehicle surface may be scratched by contact with granular dirt particles that may have collected on the mitter curtains or brushes, and/or by contact with the brushes or curtains themselves.

Alternately, brushless car washes do not scratch the surface of vehicles because no parts of the brushes car wash contact the surface of the vehicle. Instead of using mitter curtains or brushes, brushless car washes spray exterior surfaces of a vehicle with pressurized jets of fluid. The jet nozzles are arrayed in a washing frame which revolves around the vehicle or passes linearly along the vehicle, or the frame may be kept stationary wile the vehicle is passed through the frame. In any case, the object is to submit the entire readily visible exterior surface of the vehicle to the spray jets to remove dirt and grease from the vehicle's surface.

Unfortunately, the cleaning ability of the system is largely dependent upon the pressure generated by the jet sprays, and the further away the spray jets are from the vehicle, the less fluid pressure is delivered to the vehicle' surface. Accordingly, those parts of the vehicle which are furthest from the washing frame may not be adequately cleaned. Improved automated systems have been devised for moving the washing frame along a curved track in front and behind the vehicle to minimize the problem, but such systems maybe costly because they typically are mechanically more complex and/or must be suspended from an overhead surface.

Another drawback with brushless systems resides in the fact that most utilize "zero degree" nozzles which emit a straight cylindrically shaped stream or beam of liquid onto the surface of the vehicle and thus the area of coverage of each beam of liquid is minimal. To overcome this drawback, the nozzles have been mounted on rotating wands which broaden the area of coverage, but the surfaces of the vehicle still may not be thoroughly cleaned.

Zero degree nozzles have also been mounted at an angle to the surface of the vehicle so that the liquid spray impinges at an angle that may dislodge grime or dirt on the vehicle surface and, further, non-zero degree nozzles have also been utilized which spray a generally conical pattern of liquid onto the surface vehicle. Conical spray nozzles are disclosed, for example, in U.S. Pat. No. 4,788,993 issued to Beer et al.

Recently, nozzles referred to as "turbo nozzles" have been used in a stationary manner in car wash systems with the turbo nozzles emitting a narrow beam of liquid in a circulating movement that defines a conical pattern. Such nozzles are felt to improve the cleansing of the vehicle surface but to applicant's knowledge, the nozzles have always been mounted in a stationary position on the apparatus.

The present invention has been developed to provide an improvement over prior art car wash systems and to overcome the aforenoted shortcomings in prior art systems.

SUMMARY OF THE INVENTION

The apparatus of the present invention has been designed to utilize "turbo nozzles" in a more advantageous manner and does so by incorporating the turbo nozzles into wands that are mounted adjacent to the surface of the vehicle to be cleaned with the wands being mounted for reciprocating movement.

In the preferred embodiment of the invention, there are a plurality of wands mounted on a manifold carrying a liquid solution and wherein each wand is adapted to pivot about a shaft that extends substantially perpendicularly to the manifold. A drive/linkage system connects one of the wands to a drive motor which affects reciprocating movement of that wand and, further, links interconnect subsequent wands so that each wand reciprocates in unison and in parallel relationship with the adjacent wands. The linkage for interconnecting the wands extends in parallel relationship with the manifold and in closely spaced relationship therewith so that the manifold itself can be pivoted, if desired, about its longitudinal axis to change the angle of the wands relative to the adjacent vehicle in a convenient and efficient manner.

Other aspects, features and details of the present invention can be more completely understood by reference to the following detailed description of a preferred embodiment, taken in conjunction with the drawings and from the appended claims.

DESCRIPTION OF THE PREFERRED EMBODIMENT

Figure 1:
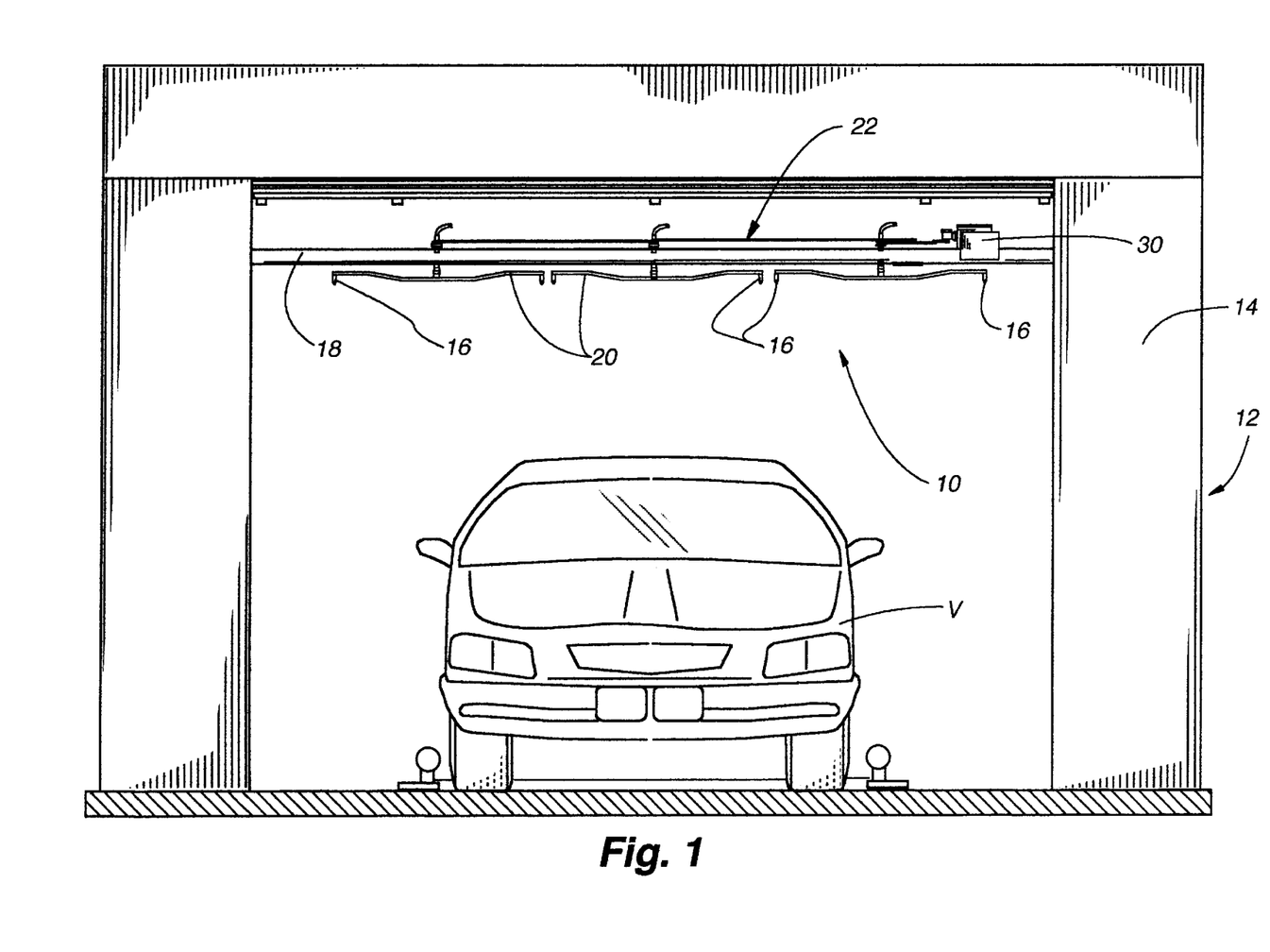
FIG. 1 is a diagrammatic front elevation of a gantry-type car wash system incorporating the reciprocating wand apparatus of the present invention.

The apparatus 10 of the present invention is shown in FIG. 1 incorporated into a gantry-type car wash system 12 wherein an inverted U-shaped frame 14 is adapted to reciprocate linearly along the length of a vehicle V to be washed while performing predetermined operations in each pass over the vehicle. Some of the operations involve spraying liquids from spray nozzles 16 operably mounted on an overhead boom 18 which is positioned across the top of the gantry. The boom is adapted to move the spray nozzles so that they spray liquid downwardly as the gantry is moved across the vehicle and once the gantry is positioned at the front or rear of the vehicle, the boom is adapted to pivot so that the direction of the liquid spray from the nozzles can be inclined relative to vertical or in a horizontal direction at the front or rear of the vehicle. The tilting of the nozzles can be accomplished with a mechanism that moves the boom on which the nozzles are mounted through a swinging arc such as of the type described in U.S. Pat. No. 6,095,435 issued Aug. 1, 2000 which is owned by the assignee of the present application or the boom itself can simply be rotated about its central longitudinal axis, and in such instance, the boom can be moved vertically during or prior to rotation of the boom about its central longitudinal axis to properly position the nozzles at a desired elevation.

It is well known in the art to provide rotating wands having spray nozzles disposed at opposite ends thereof so that the nozzles are moved in a rotating pattern with an example again being U.S. Pat. No. 6,095,435 referenced above. Typically, the nozzles are zero-degree nozzles even though constant spray nozzles that are not zero degree have also been used. In accordance with the present invention, however, a plurality of wands 20 are reciprocally connected to the boom 18 that is preferably a manifold that extends transversely of the car wash system 12 with each wand being operably connected to a drive/link system 22 so that it pivotally reciprocates about a shaft 24 operably connected and perpendicular to the manifold. Each wand has a nozzle mounted on each end thereof so that each nozzle is reciprocated in an arcuate pattern. The nozzles are turbo nozzles that will be described in more detail later. Of course, the reciprocation takes place as the wash apparatus is moved relative to the vehicle so that each turbo nozzle while moving in an arcuate pattern, is also moved linearly relative to the vehicle. While the apparatus of the present invention is being described in connection with reciprocating wands mounted on an overhead boom 18 that is moved relative to the vehicle along the length of the vehicle, it will be apparent with minor modification which is within the skill of those in the art to mount the nozzles on a vertically extending member so that the nozzles extend along the side of the vehicle and, further, could be utilized in a tunnel-type car wash where the vehicle was moved relative to the washing apparatus rather than the apparatus relative to the vehicle.

Figure 2:
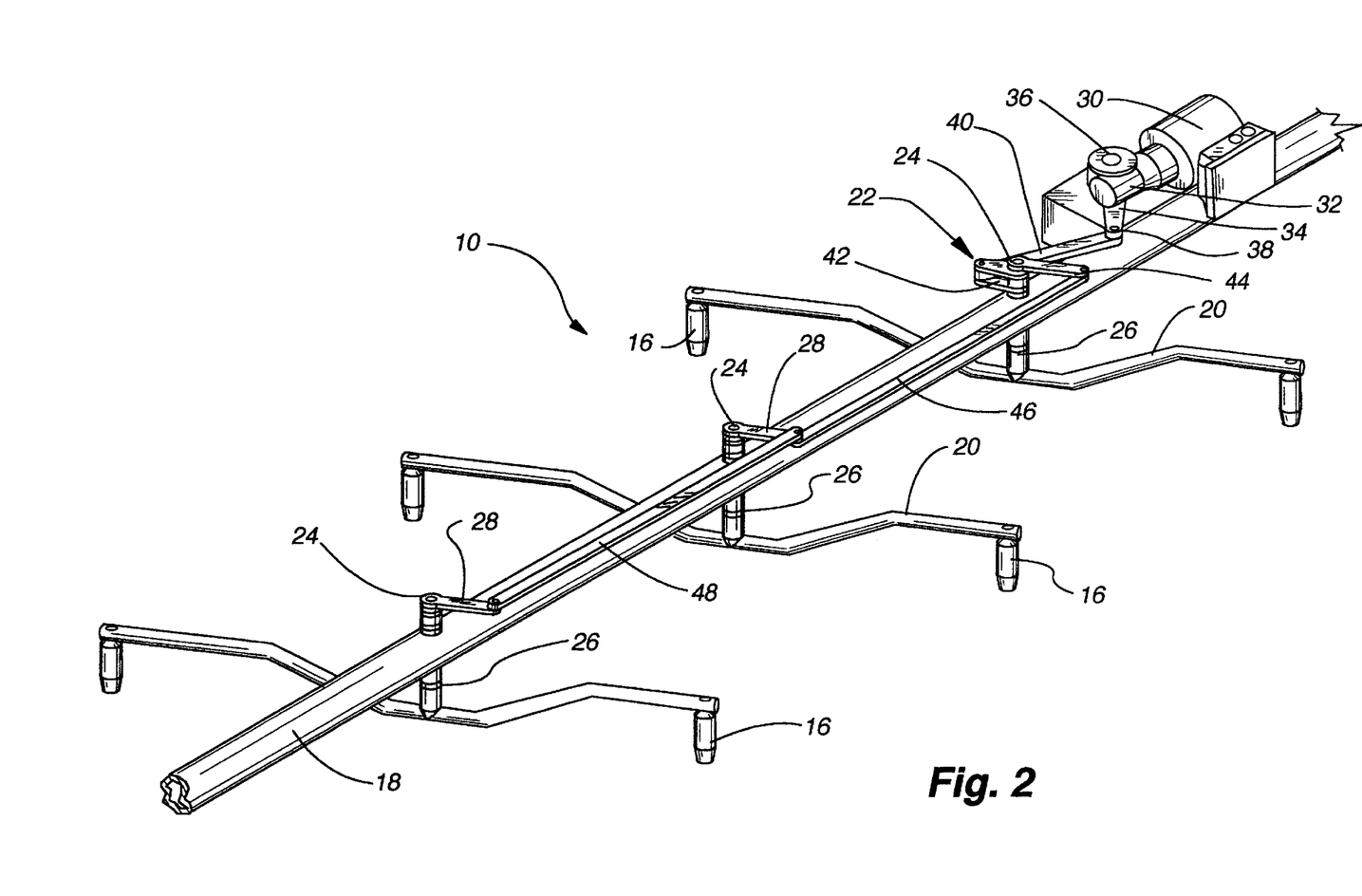
FIG. 2 is an isometric view of the reciprocating wand apparatus of the present invention mounted on a cylindrical manifold with parts of the manifold being removed.

With reference to FIG. 2, the apparatus 10 in accordance with the present invention is shown mounted on the hollow tubular cylindrical manifold 18 that is horizontally disposed to extend transversely of the gantry. The manifold is connected to a supply (not shown) of pressurized liquid to be sprayed onto the vehicle and supports the three equally spaced reciprocating wands 20 through the vertical hollow pivot shaft 24 associated with each wand that is mounted on appropriate bearings 26 that allow the wands to reciprocate in a horizontal plane through their operative connection with the drive/link system 22. Each hollow pivot shaft is in fluid communication in a conventional manner with the interior of the manifold 18 so that liquid within the manifold can pass from the manifold into the interior of the hollow pivot shaft. Each pivot shaft is, in turn, in fluid communication with the interior of each wand 20, which is also of hollow tubular configuration, so that liquid from the manifold can be passed into the wands in equal quantities. Each wand has a turbo nozzle 16 mounted at each end thereof with the nozzles being directed downwardly to direct a cyclical conical spray of fluid in a downward direction and in a manner to be described in more detail hereafter.

Each pivot shaft 24 has a crank link 28 fixed thereto adjacent to its uppermost end with the crank link being keyed to the shaft so that pivotal movement of the crank link in a horizontal plane about the vertical axis of the pivot shaft causes the pivot shaft 24 and the connected wand 20 to reciprocate in a corresponding manner. The drive/link system 22 includes a drive member 30 and a plurality of crank and link members which interconnect the drive member with the reciprocating wands. In the disclosed embodiment, the drive member is an electric motor having an output shaft (not seen) operably connected through a gear box 32 to a primary crank arm 34 that is rotated in a horizontal plane about a vertical output shaft 36 of the gear box. The distal or free end 38 of the primary crank arm is pivotally connected to a drive link 40 whose opposite end is pivotally connected to a bifurcated secondary crank arm 42 that is keyed to the vertical pivot shaft 24 of the first reciprocating wand 20, i.e. the wand that is closest to the motor 30.

As will be appreciated, when the drive motor 30 is driven in either direction, the primary crank arm 34 rotates and causes the drive link 40 to pivot in a horizontal plane while being slid reciprocally within the horizontal plane along a path parallel to the length of the manifold 18. This sliding and reciprocating movement of the drive link causes the secondary bifurcated crank arm 42 to pivot back and forth in the same horizontal plane about the vertical shaft 24 of the first reciprocating wand thereby causing that vertical shaft, the connected wand and the associated crank link 28 to reciprocate in a corresponding manner. The free end 44 of the first crank link is pivotally connected to a first connecting link 46 whose opposite end is pivotally connected to the free end of the crank link 28 of the second wand 20 (i.e. the wand closest to the first wand). A second connecting link 48 longitudinally aligned with the first connecting link 46 is pivotally connected to the free end of the second crank link at the same location as the first connecting link and has its opposite end pivotally connected to the crank link 28 associated with the third wand 20 or the wand that is furthest removed from the drive motor 30.

It is important to appreciate that the crank links 28 and the bifurcated secondary crank arm 42 are relatively short so that the connecting links 46 and 48, which interconnect adjacent crank links, are positioned parallel to and are closely adjacent to the manifold 18. In the preferred embodiment the connecting links and crank link are no more than ¾ of an inch from the manifold and preferably about ½ inch. This provides for a very compact system for reciprocating the wands 20 as will be described hereafter. The compactness is important inasmuch as the manifold, as described previously, may be mounted to pivot about its longitudinal axis or an axis parallel thereto so that the spacial orientation of the wands 20 can be changed between horizontal and vertical or any angle therebetween, and the close proximity of the links and crank arms to the manifold allows this to be accomplished without an unwieldy mechanism.

While three wands 20 with wand shafts 26 are illustrated, any number could be used with two or more wands and wand shafts requiring at least two links 46 being preferable.

Figure 4:
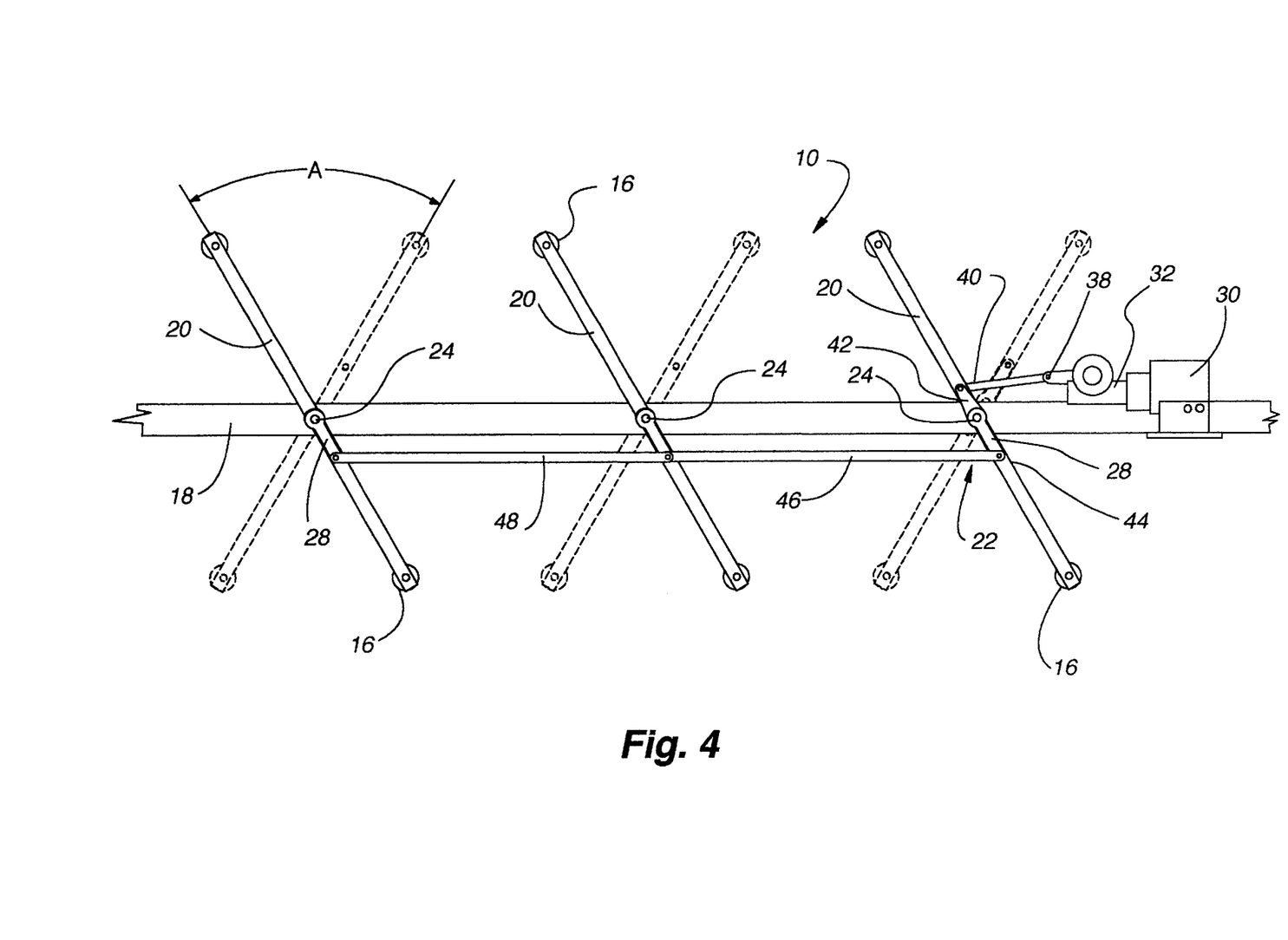
FIG. 4 is a diagrammatic top plan view of the apparatus shown in FIG. 2 with the wands being shown in an alternate position with dashed lines.

In operation, it will be appreciated that as the drive motor 30 is operated, its output shaft causes the primary crank 34 to rotate thereby causing the connected drive link 40 to reciprocate effecting reciprocation of the secondary bifurcated crank arm 42 in a horizontal plane which, in turn, causes the connected pivot shaft 24 of the first wand 20 to pivot about its longitudinal axis a corresponding amount. That same pivotal movement is transferred to the first crank link 28 with the pivotal movement of the first crank link being transferred from the first crank link to the second crank link through the first connection link 46 and from the second crank link 28 to the third crank link 28 through the second connection link 48. Each reciprocating wand is thereby enabled to pivot in unison in a horizontal plane as illustrated best in FIG. 4. In FIG. 4, it can be seen from the full line and dashed line positions of the reciprocating wands that the associated nozzles are pivoted back and forth along an arc "A" a predetermined degree which, when associated with the spray pattern of the nozzles on the reciprocating wands as described later, provide complete coverage of the surface of a vehicle being washed with the apparatus.

Figure 3:
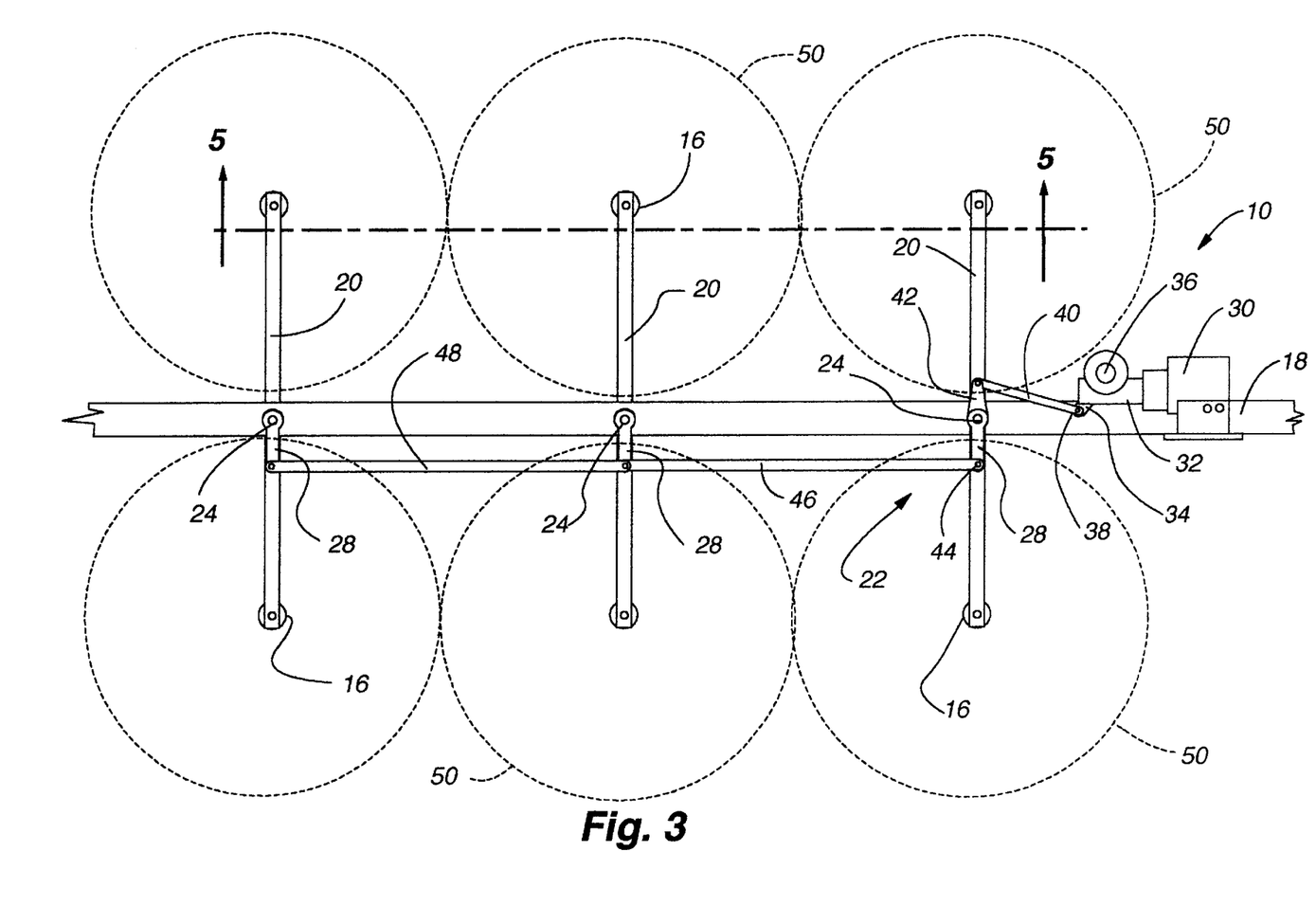
FIG. 3 is a diagrammatic top plan view of the apparatus illustrated in FIG. 2 showing the spray pattern of liquid from the nozzles used in the apparatus in dashed lines.
Figure 5:
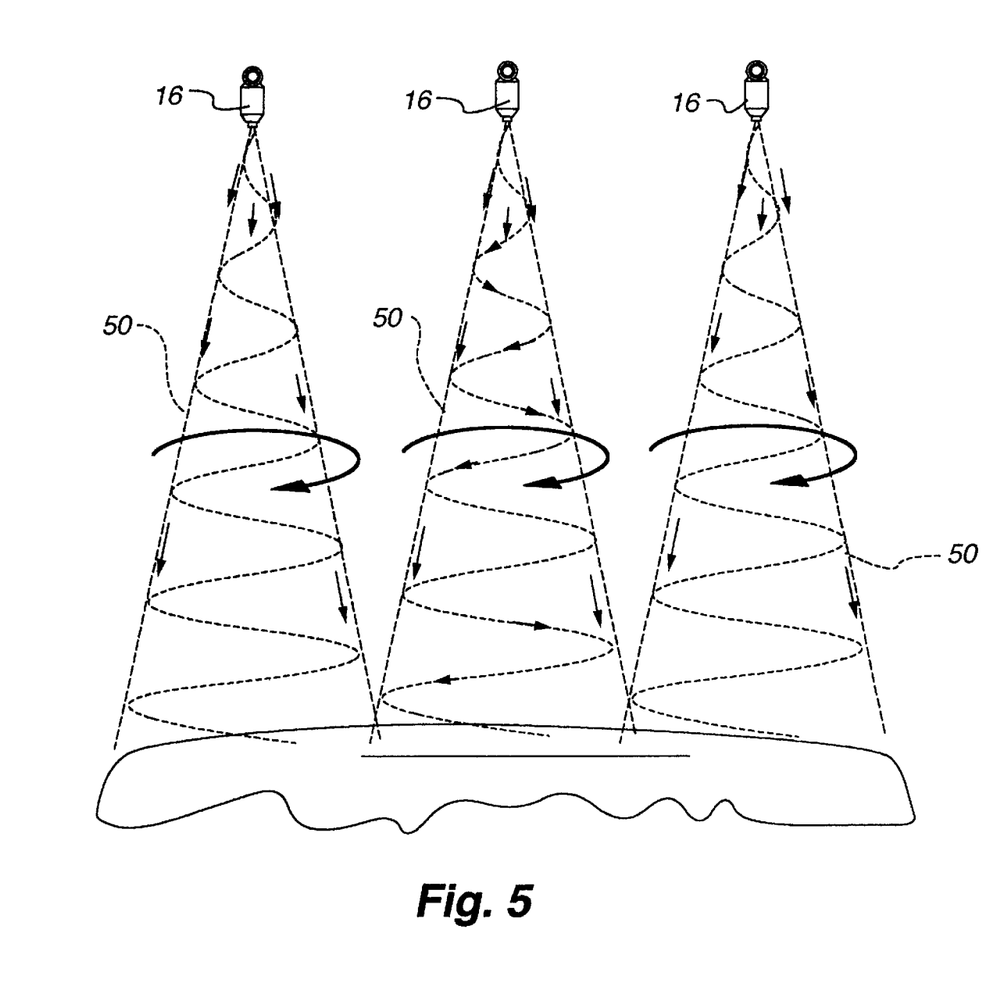
FIG. 5 is a diagrammatic elevational view illustrating the circulating conical spray pattern of liquid emitted from the turbo nozzles used in the apparatus shown in FIG. 2.

As best appreciated by reference to FIGS. 3 and 5, each turbo nozzle 16 emits a beam or stream of liquid in a straight line which is directed at an acute angle from the vertical axis of the nozzles. The straight beam or stream of liquid emitted from the nozzle is caused to move, by the nozzle's internal construction, in a circulating pattern which creates a conical wall or pattern 50 of liquid which, of course, is circular in transverse cross section as illustrated in FIG. 3. The turbo nozzles are commercially available and one that has been found to be suitable is manufactured under Model No. TN 220-045 by Speck Tri Plex of Bilifield, Germany. The straight beam or stream of liquid is rotated at a relatively fast rate of approximately 2000 rps (revolutions per second) so that even though a single straight stream of liquid is being emitted from the nozzle at all times, it has the appearance of a conical pattern as best illustrated in FIG. 5.

With reference to FIG. 3, depending upon the spacing of the nozzles 16 from the surface of the vehicle being cleaned, a circular line of liquid of a certain diameter will be sprayed onto the surface of the vehicle. At a predetermined spacing of approximately two feet (for example), that pattern is a circle of radius r and when the spacing between associated nozzles of each of the wands is approximately 2r the circular spray patterns impinging upon the vehicle surface are tangential to each other. In that manner, the conical spray emitted from each nozzle would meet the conical spray of the corresponding nozzle of an adjacent wand so that the lateral surface of the vehicle is covered from side to side. Of course, as is appreciated, the apparatus is moving relative to the vehicle so that the same lateral coverage of the vehicle is moved along the length of the vehicle to thereby cover the entire exposed surface area of the vehicle. Further, since each wand 20 carries a turbo nozzle 16 at each end thereof, the surface of the vehicle is in essence covered by the emitted liquid from two nozzles and the reciprocating movement of the wands creates a desired degree of turbulence for efficient cleaning of the vehicle.

As will be appreciated with the gantry-type wash system 12 illustrated in FIG. 1, when a vehicle V is positioned beneath the apparatus 10 and the apparatus is moved back and forth linearly of the vehicle and with the manifold 18 positioned above the vehicle and the spray nozzles 16 directed vertically downwardly, a very thorough cleansing of the top surface of the vehicle is created by the conical circulating streams of liquid, their reciprocating movement relative to each other, and the movement of the turbulent flow of water across the top of the vehicle. When the gantry reaches each end of the vehicle, as described previously, and dependent upon the other operative components of the car wash system, the manifold 18 can be oriented so that the wands 20 form an angle with vertical or may even be oriented vertically so that the nozzles 16 direct the streams of liquid in a substantially horizontal direction or any angle between vertical and horizontal thereby effectively cleaning the front and rear of the vehicle. Also, as mentioned previously, the afore-described apparatus can be mounted vertically along the sides of the vehicle to wash the sides of the vehicle in the same manner.

Although the present invention has been described with a certain degree of particularity, it is understood that the present disclosure has been made by way of example, and changes in detail or structure may be made without departing from the spirit of the invention as defined in the appended claims.

What is claimed is:

1. An apparatus for spraying liquids onto a vehicle, said vehicle having a length extending substantially from a front end to a back end, the apparatus comprising in combination, an elongated support member, at least one hollow elongated wand reciprocally mounted on said support member, said wand having a pair of nozzles mounted at spaced locations along the length of said wand in fluid communication with said wand, and said wand being adapted to reciprocate relative to said support member, drive means operably connected to said wand for reciprocating said wand about an axis substantially perpendicular to the length of said wand and to the length of said vehicle, and wherein said nozzles are each capable of emitting a beam of liquid that rotates in a conical pattern as it is directed onto a surface of said vehicle.

2. An apparatus for spraying liquids onto a vehicle, said vehicle having a length extending substantially from a front end to a back end, the apparatus comprising in combination, an elongated liquid conducting manifold, a plurality of hollow elongated wands reciprocally mounted on said manifold in fluid communication with said manifold and at spaced locations along the length of said manifold, said wands each having a pair of nozzles mounted at spaced locations along the length of the associated wand in fluid communication with said wand such that liquid conducted through said manifold is emitted through said nozzles, and said wands being adapted to reciprocate relative to said manifold, drive means operably connected to said wands for reciprocating said wands about axes substantially perpendicular to the length of said wands and to the length of said vehicle, and wherein said nozzles are each capable of emitting a beam of liquid that rotates in a conical pattern as it is directed onto a surface of said vehicle.

3. An apparatus for spraying liquids onto a vehicle to be washed comprising in combination:

an elongated liquid conducting manifold, a plurality of hollow elongated wands reciprocally mounted on said manifold in fluid communication with said manifold and at spaced locations along the length of said manifold, said wands each having a pair of nozzles mounted at spaced locations along the length of the associated wand in fluid communication with said wand such that liquid conducted through said manifold is emitted through said nozzles, drive means operably connected to said wands for reciprocating said wands about axes substantially perpendicular to the length of said wands, said drive means including a motor operably connected to a rotating output shaft, a crank secured to said rotating shaft for unitary rotative movement therewith, each wand including a shaft extending along an axis that is substantially perpendicular to its length, a first link operably connecting said crank to a first of said wand shafts to effect reciprocating movement of said shaft and its associated wand upon rotational movement of said crank and at least one elongated second link extending parallel to said manifold and operably connecting said first wand shaft to a second wand shaft to effect coordinated reciprocating movement of said first and second wand shafts and the associated wands.

4. The apparatus of claim 3 wherein there are more than two of said wand shafts interconnected by at least two of said second links and wherein said second links are substantially in longitudinally aligned relationship.

5. The apparatus of claim 3 wherein said at least one second link is positioned in closely adjacent relationship to said manifold.

6. The apparatus of claim 4 wherein said second links are positioned in closely adjacent relationship to said manifold.

7. The apparatus of claim 3 wherein each wand shaft includes a wand crank to which said first link and/or said second link are connected.

* * * * *

UNITED STATES PATENT AND TRADEMARK OFFICE
CERTIFICATE OF CORRECTION

PATENT NO. : 6,394,370 B1
DATED : May 28, 2002
INVENTOR(S) : Don L. Payne, James D. Johnson and Dan Fratello It is certified that error appears in the above-identified patent and that said Letters Patent is hereby corrected as shown below:

<u>Title page,</u>
Item [75], after "Johnson," delete "Westminster, CO" and insert -- Coeur D'alene, ID --; and add -- Dan Fratello, Golden, CO (US) --.

Signed and Sealed this

Twenty-sixth Day of November, 2002

Attest:

Attesting Officer

JAMES E. ROGAN
Director of the United States Patent and Trademark Office